United States Patent [19]

Andrione et al.

[11] 4,386,859
[45] Jun. 7, 1983

[54] COMPRESSORS FOR REFRIGERANT FLUIDS

[75] Inventors: Norbert Andrione; Fulvio Bandoli, both of Turin, Italy

[73] Assignee: Aspera S.p.A., Asti, Italy

[21] Appl. No.: 274,000

[22] Filed: Jun. 15, 1981

[51] Int. Cl.³ .................................... F16C 17/04
[52] U.S. Cl. .................................... 384/420
[58] Field of Search .............. 308/139, 167, 163, 161, 308/DIG. 8, 23, 22; 384/420, 424, 243, 248, 250, 251

[56] References Cited

U.S. PATENT DOCUMENTS

| | | |
|---|---|---|
| 2,312,596 | 3/1943 | Smith . |
| 3,295,753 | 1/1967 | Butts et al. ..................... 417/424 |
| 4,099,761 | 7/1978 | Cullings ........................... 308/163 |
| 4,111,499 | 9/1978 | McCloskey ................... 308/DIG. 8 |

FOREIGN PATENT DOCUMENTS

| | | |
|---|---|---|
| 1058317 | 5/1959 | Fed. Rep. of Germany . |
| 1601054 | 5/1970 | Fed. Rep. of Germany . |
| 1413563 | 1/1966 | France . |

*Primary Examiner*—Lenard A. Footland
*Attorney, Agent, or Firm*—Sughrue, Mion, Zinn, Macpeak and Seas

[57] ABSTRACT

In a compressor for refrigerant fluids, the thrust bearing for a vertical crankshaft comprises, on the one hand, an annular element of a material with a low coefficient of friction, which is rotatable with a main journal above the shaft and has a flat lower radial surface, and comprises, on the other hand, a flat radial surface machined on an upper main bearing fixed in the compressor casing. The lower surface of the annular element bears upon the flat radial surface of the upper main bearing.

5 Claims, 4 Drawing Figures

U.S. Patent  Jun. 7, 1983  Sheet 3 of 3  4,386,859
FIG. 3
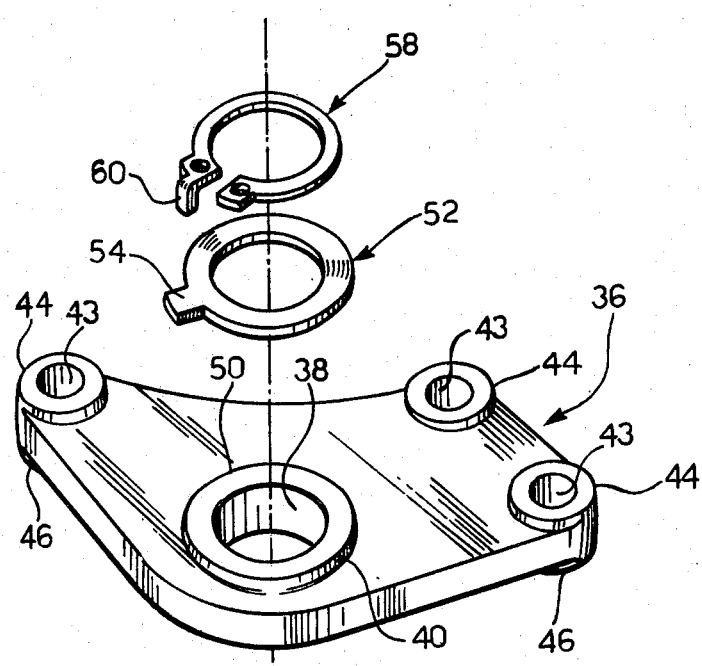
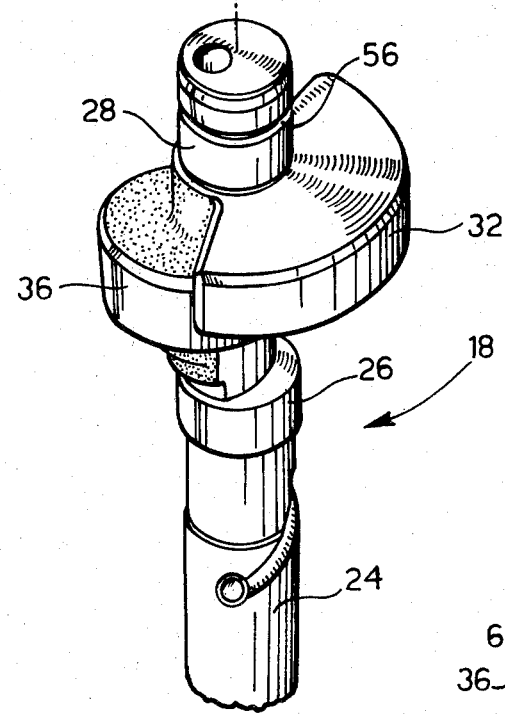
FIG. 4
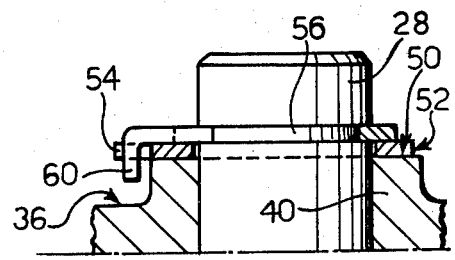

COMPRESSORS FOR REFRIGERANT FLUIDS

The present invention relates to compressors for refrigerant fluids, and is concerned more particularly with a compressor of the type comprising a vertical crankshaft which is mounted rotatably in a casing defining a horizontal cylinder of the compressor, wherein the shaft includes a pair of main journals, one being located beneath a crank pin and being rotatable in a lower main bearing machined in the casing, and the other being located above the crank pin and being rotatable in an upper main bearing fixed in the casing, the main bearings comprising radial bearings, and wherein the shaft is supported axially in the casing by an axial thrust bearing.

In known compressors of this type, the thrust bearing comprises a flat annular surface which faces upwardly and is machined on an upper face of the casing at the upper end of the lower main bearing. The upper end of the lower main journal of the crankshaft is formed with a collar having a flat lower annular surface which bears upon the corresponding annular surface of the casing.

In existing compressors, both the casing and the shaft are made from cast-iron, and the annular surfaces of the thrust bearing are cast-iron surfaces which require extremely accurate machning so as to be absolutely flat and perpendicular to the common axis of the main bearings and the shaft. In practice, the only acceptable accurate machining is a lapping operation which involves high costs.

The problem forming the basis for this invention is that of achieving a compressor of the aforesaid type, in which the axial thrust bearing is very economical to produce whilst still ensuring efficient working of the compressor.

According to the present invention, this problem is solved by a compressor characterised in that the thrust bearing comprises, on the one hand, an annular element of a material with a low coefficient of friction, which is rotatable with the upper main journal and has a flat lower radial surface, and, on the other hand, a flat radial surface which is machined on the upper main bearing and upon which the lower surface of the annular element bears.

In a compressor according to the invention, the thrust bearing is associated with the upper main bearing which comprises, in known manner, a plate element bolted to the casing. Since this plate element is small, the difficulties in machining it are fewer than for a larger element, such as a compressor casing. It is not difficult, therefore, to produce this plate element in a grinding operation by passing it between opposing grinding wheels. This passage between opposing wheels facilitates the formation, on the upper main bearing, of a flat radial surface constituting the fixed surface of the thrust bearing, and, moreover, ensures that this flat surface is perpendicular to the axis of the cylindrical seating in which the upper main journal of the crankshaft rotates. In a compressor according to this invention, there is no sliding contact between cast iron surfaces, since one of these surfaces, that is, the rotating part of the bearing, is made from the low friction coefficient material of the annular element, and simple grinding of the aforesaid flat radial surface is possible.

Further characteristics of the invention will be apparent from reading the following detailed description, given with reference to the accompanying drawings which show a preferred embodiment, and in which:

FIG. 3 is an exploded perspective view of an upper portion of the compressor crankshaft, its upper main bearing, and the elements constituting the thrust bearing, and FIG. 4 is a side elevational view, on an enlarged scale, of an upper main journal of the crankshaft, and shows in vertical section the elements attached to the journal to form the axial thrust bearing.

Figure 1:
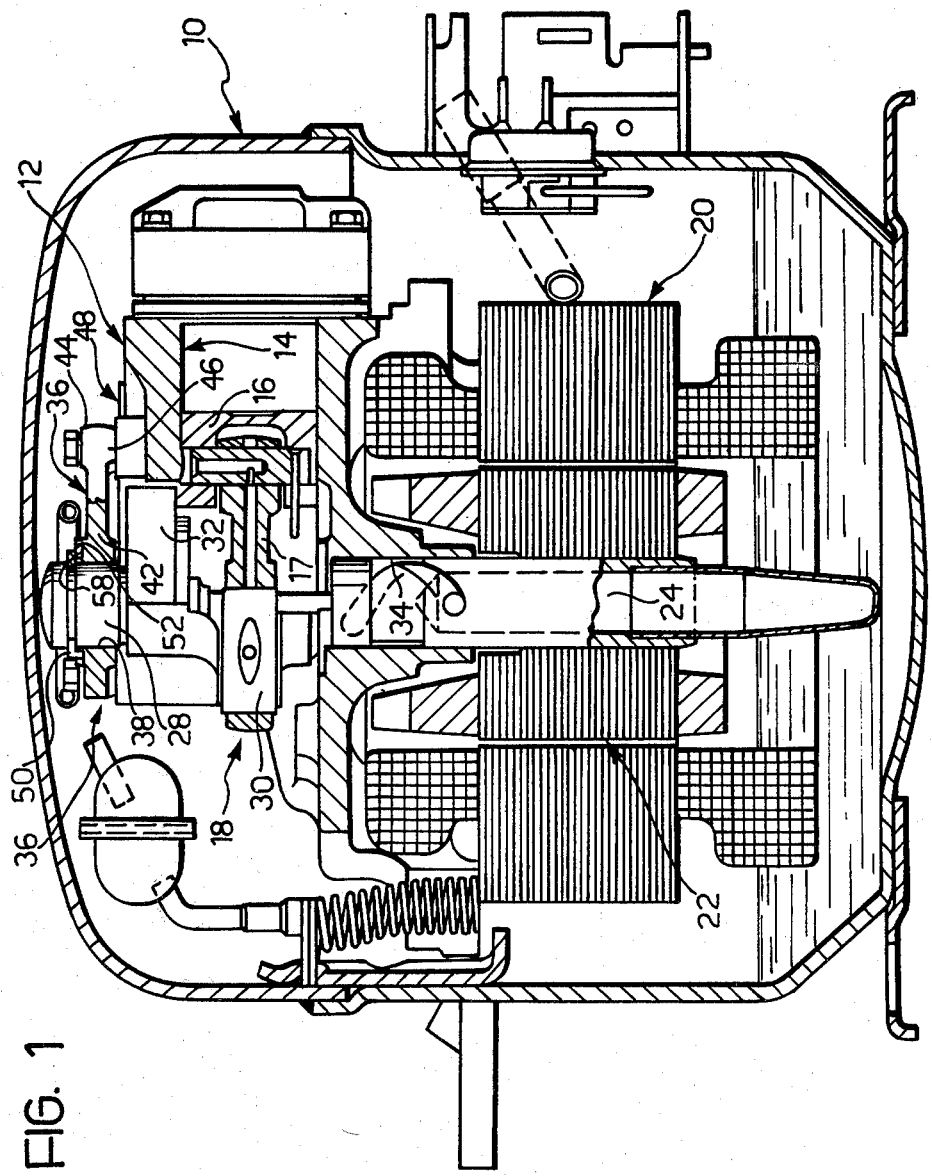
FIG. 1 is a vertical sectional view of a compressor.
Figure 2:
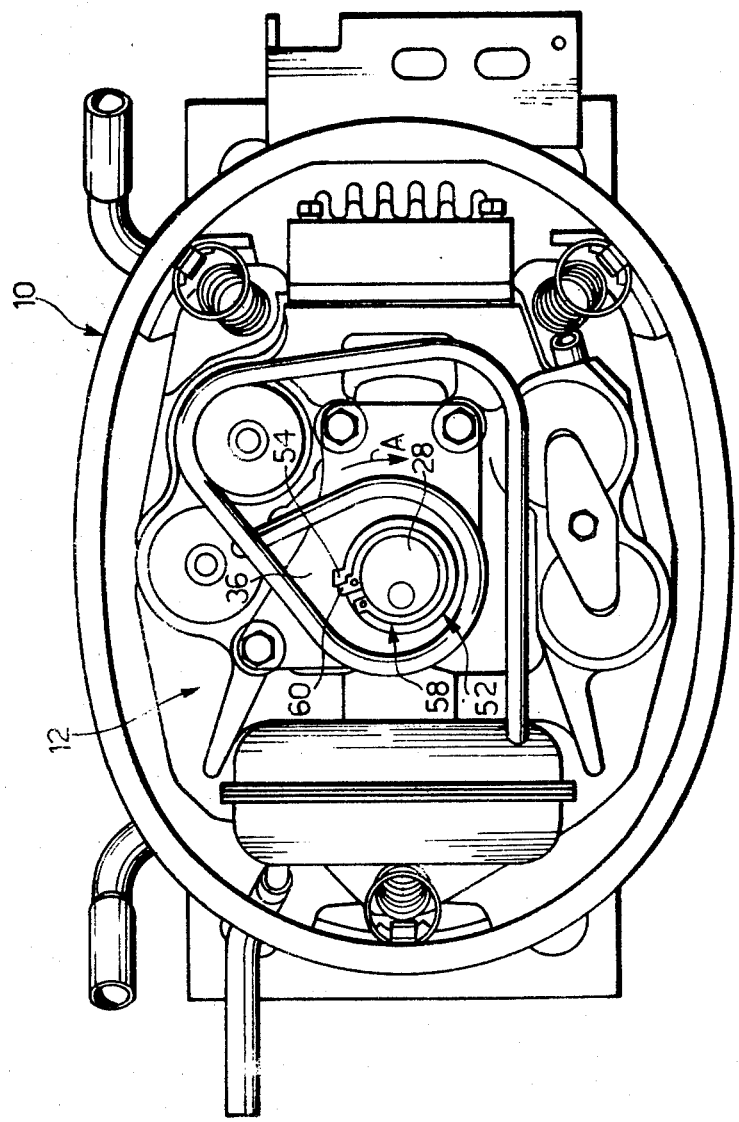
FIG. 2 is a plan view from above, omitting an upper portion of the casing.

With reference to FIGS. 1 and 2, a compressor for refrigerant fluids, of the type currently used, for example, in domestic refrigerators, includes a hermetic sheet metal housing 10 within which is resiliently suspended the casing 12 of a compressor. The casing 12 includes a cylinder 14, with a horizontal axis, which houses a piston 16. The piston 16 is coupled by a connecting rod 17 to the crank pin of a crankshaft 18 with a vertical axis. Lower down, the casing 12 supports the stator unit 20 of an electric motor, the rotor of which is indicated as 22. The rotor 22 is keyed on to a lower tubular extension of the crankshaft 18.

Referring to FIGS. 1 and 3, the crankshaft 18 includes a lower main journal 26 and an upper main journal 28. Between the two main journals 26, 28 the crankshaft 18 comprises, from the bottom upwards, a crank pin 30 and a balance weight 32.

As shown in FIG. 1, the lower main journal 26 is rotatably housed in a bore 34 in the casing 12, which constitutes a lower main bearing located beneath the crank pin 30.

The upper portion of the casing 12 carries a cast-iron plate element 36 which is bolted to the casing (see also FIG. 2). The support plate 36 constitutes a main bearing and, for this purpose, has a bore 38 within which the upper main journal 28 is rotatable. The bore 38 is machined in a thickened portion of the plate element 36, which defines upper and lower central bosses 40, 42, respectively, on the two faces of the element. For fixing, the plate element 36 has three bolt holes 43 which are also made in thickened portions of the element, and define, on both faces, upper and lower bosses 44, 46.

The plate element 36, which is produced by casting, is then subjected to grinding, being passed between two grinding wheels, so that the upper surfaces of the bosses 40, 44 are coplanar, and the lower surfaces of the bosses 46 are coplanar with, and parallel to, the foregoing surfaces. The cylindrical grinding of the bore 38 is effected with reference to the flat surfaces of these bosses.

The casing 12 has an upper surface 48 which is ground flat and is perpendicular to the axis of the lower bearing 34. The ground surfaces of the bosses 46 abut this ground surface 48 and thus achieve effective parallelism between the axis of the bore 38 and the axis of the bore 34, whilst coincidence of these two axes depends on accurate perpendicularity between the axis of the bore 38 and the plane containing the surfaces of the three bosses 46.

Referring to FIG. 4, as well as FIGS. 1 to 3, the upper annular ground surface of the boss 40 is indicated 50. This flat radial surface 50 constitutes the static bearing surface of an axial thrust bearing for the crankshaft 18.

The rotating surface which cooperates with the thrust bearing is the lower annular surface of an annular element 52. The annular element 52 comprises a washer having flat surfaces and a peripheral radial projection or tab 54.

The washer 52 made from a synthetic material with a low coefficient of friction. The preferred material is a phenolic resin with a filling of a solid lubricant. Producing an annular element 52 of this material, with flat parallel surfaces, presents no technological difficulties. Moreover, for use in a bearing, a synthetic material, particularly a phenolic resin, has the advantage of being quiet.

That portion of the upper main journal 28 which projects above the plate element 36 is formed with an annular groove 56. Within this groove is tightly engaged a resilient split ring 58 which is very similar to what is known commercially as a "Seeger ring", but has at one end of its circumference an appendage or finger 60. The appendage 60 is bent downwardly and engages the radial projection 54 of the washer 52 like a catch plate.

The direction of rotation of the crankshaft 18 is shown by the arrow A in FIG. 2. The resilient ring 58, being tightly engaged in the groove 56, is in effect keyed onto the main journal 28 of the shaft 18 and rotates with it, so that the appendage or finger 60, by engaging the projection or tab 54, carries the washer 52 in rotation. In this way, sliding occurs beneficially between the lower surface of the washer 52 and the upper ground surface 50 of the boss 40, while, at the same time, the split ring 58 constitutes an annular bearing or suspension shoulder for the shaft 18 upon the washer 52.

We claim:

1. A compressor for refrigerant fluids comprising a casing defining a horizontal cylinder of the compressor and having upper and lower main radial bearings, a crank shaft vertically mounted for rotation within said casing including upper and lower main journals rotatable in said upper and lower main bearings respectively and a crank pin disposed between said upper and lower main journals within said casing and an axial thrust bearing for supporting said shaft axially in said casing, said axial thrust bearing being comprised of a flat radial surface machine on said upper main bearing, an annular shoulder having a flat lower radial surface carried by said upper main journal for rotation therewith, an annular washer element of a material having a low coefficient of friction having flat upper and lower faces being interposed between said upper main bearing and said annular shoulder in engagement therewith and means for mutually engaging said washer and shoulder to impart rotation to said washer.

2. A compressor as set forth in claim 1 wherein said washer has a peripheral radial projection and said annular shoulder is comprised of a resilient split ring engaged in a groove in said upper main journal, said ring having at one end of its circumference a downwardly bent appendage which engages said radial projection of said washer as a catch plate.

3. A compressor as claimed in claim 1 wherein said annular washer element is made from a synthetic material.

4. A compressor as claimed in claim 3 wherein said synthetic material is a phenolic resin.

5. A compressor as claimed in claims 3 or 4 wherein said synthetic material contains a filling of a solid lubricant.

* * * * *